United States Patent [19]

Lake

[11] Patent Number: 4,891,804
[45] Date of Patent: Jan. 2, 1990

[54] DATA SWITCHING ARRANGEMENT

[75] Inventor: David J. Lake, Nottingham, England

[73] Assignee: GEC Plessey Telecommunications, Limited, Coventry, England

[21] Appl. No.: 216,545

[22] PCT Filed: Nov. 9, 1987

[86] PCT No.: PCT/GB87/00793
§ 371 Date: Sep. 2, 1988
§ 102(e) Date: Sep. 2, 1988

[87] PCT Pub. No.: WO88/03732
PCT Pub. Date: May 19, 1988

[30] Foreign Application Priority Data
Nov. 13, 1986 [GB] United Kingdom ............... 8627108

[51] Int. Cl.$^4$ .................... H04L 11/00; H04L 11/16
[52] U.S. Cl. .................... 370/61; 370/95.1; 370/99
[58] Field of Search .............. 370/61, 67, 68.1, 85, 370/95, 29, 60, 94, 99, 110.1

[56] References Cited

U.S. PATENT DOCUMENTS
4,530,093 7/1985 Akram et al. .................... 370/85

FOREIGN PATENT DOCUMENTS
0206641 12/1986 European Pat. Off. .
8505241 11/1985 PCT Int'l Appl. .
2162722 2/1986 United Kingdom .

Primary Examiner—Douglas W. Olms
Assistant Examiner—Melvin Marcelo
Attorney, Agent, or Firm—Michael F. Oglo; Julian C. Renfro

[57] ABSTRACT

A Data Switching Arrangement having a plurality of data switching groups connected by a time division multiplexed data highway, each switching group including data interface means having the ability to store segments of data from terminals either prior to transmission in the transmission timeslot or as received from another terminal in the receive timeslot. The timeslots are initially assigned by a central control unit.

7 Claims, 3 Drawing Sheets

DATA SWITCHING ARRANGEMENT

The present invention relates to Data Switching Arrangements and more particularly but not exclusively to a switching arrangement between the line cards in a data communications system.

It is often found necessary in communications systems to transmit blocks of data from one line card to another within the system. A typical line card will have a capacity to cater for 8 ports of data from a corresponding number of terminals, each port operating at up to 16 Kbps in each direction. Thus in a proposed system having 64 data ports on several cards the overall rate would be 1 Mbps each way. It is also advantageous to use serial signalling as this reduces the number of interconnections required.

Standard high data link communication (HDLC) implementations are impractical for such a system as each block of data would have to be routed from the line card to an HDLC master controller, which would then re-transmit the data to its intended destintion. The minimum data rate for such a system is over 2 Mbps and thus has to be discarded due to the lack of high speed HDLC devices available and workload specification necessary from linecard processors.

A solution to the problem of linecard-to-linecard communication using fixed links or a Local Area Network (LAN) can be achieved but this is a costly option and therefore must be discarded.

It is an objective of the present invention to provide a switching arrangement which is practical and relatively inexpensive.

According to an embodiment of the present invention there is provided a time division multiplexed switching system comprising a plurality of data switching groups interconnected by a time division multiplexed data highway and central processing means, each of said switching groups comprising a plurality of data terminals connected to data interface means, the interface means comprising buffer storage means in respect of connected data terminals and control means responsive to data from the central processing means to transfer data to and from the data highway, each terminal in the system accessing the central processing means only when data therein is assembled for transmission, the central processing means allocating a transmit and/or a receive timeslot when so accessed and transferring data defining the or each time slot to the respective control means associated with the transmitting and receiving data terminals, the control means in each group causing data from the transmitting terminal to be held in the buffer storage means and to be segmented, each data segment in turn being associated with control data and transmitted to the data highway in the allocated time slot.

An embodiment of the present invention will now be described by way of example only with reference to the accompanying drawings in which.

Figure 1:
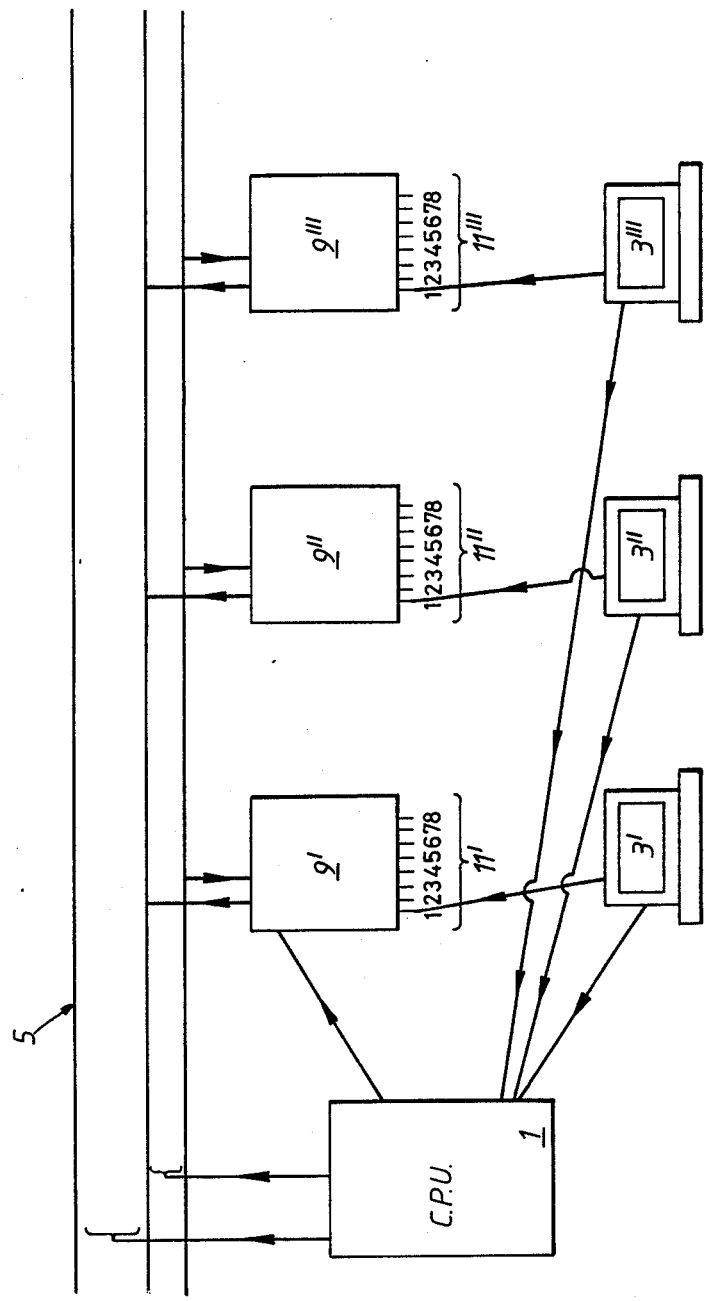
FIG. 1 is a schematic view of an arrangement to conduct data switching including a data steering element according to the present invention.

FIG. 1 shows a schematic view of an arrangement to conduct data switching according to the present invention, a central processor unit (CPU) 1 is instructed that data at a terminal 3 is ready for transmission. The CPU 1 designates transmit and receive timeslots in a network highway 5, the necessary 'setting-up' signalling being sent to the terminal 3 and a data interface means 9. In the embodiment described herein each data interface means 9 has ports 11 capable of connecting eight data terminals 3.

A typical sequence of data transmission between two terminals 3 would thus be:
 (i) data ready signal sent to CPU 1 from the terminal 3;
 (ii) CPU 1 allocates transmit and receive timeslots for data transfer by sending 'set-up' signals to both the data interface means 9 associated with the transmitting and receiving terminals 3 through serial connections;
 (iii) data is fed from the transmitting terminal 3' to the interface means 9' where it is buffered and subsequently controlled;
 (iv) data from the interface means 9' is transmitted in its allocated timeslot and data is received by the interface means 9 in the corresponding receive timeslot.
 (v) the received data is fed through the interface means 9 to the terminal 3.

Figure 2:
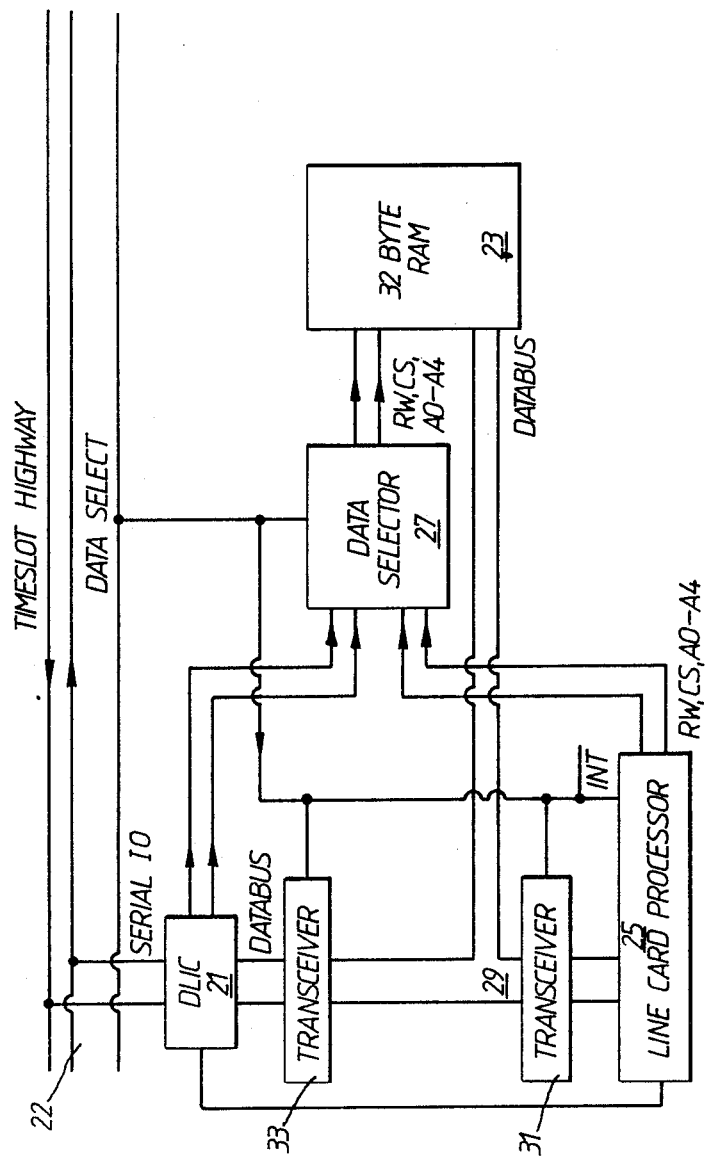
FIG. 2 is a schematic view of the data steering element included in FIG. 1; and, FIG. 3 illustrates a typical time frame definition for an arrangement according to FIG. 1.

An important aspect of the invention is thus the data interface means 9 as shown in FIG. 2.

The DLIC device 21 is able to access a random access memory (RAM) 23 via its parallel bus, transferring data between the RAM and serial bus highway 22 in one of 64 timeslots. In the embodiment illustrated the RAM 23 is shared between the DLIC 21 and a line card processor 25 on a roughly 50/50 basis.

The data is buffered in the line card processor 25 as serial store, byte length segments are cleaved from the buffer and associated with a further byte of control data. A selector element 27 is instructed by the line card processor 25 to enable the RAM 23, designate an address and either indicate read or write data into the RAM 23. The byte of terminal 3 data and the byte of associated control data are transmitted along databus highway 29 to the RAM 23 from the line card processor 25. Two transceiver interfaces 31, 33 act in the highway 29 to direct the transmitted data.

Figure 3:
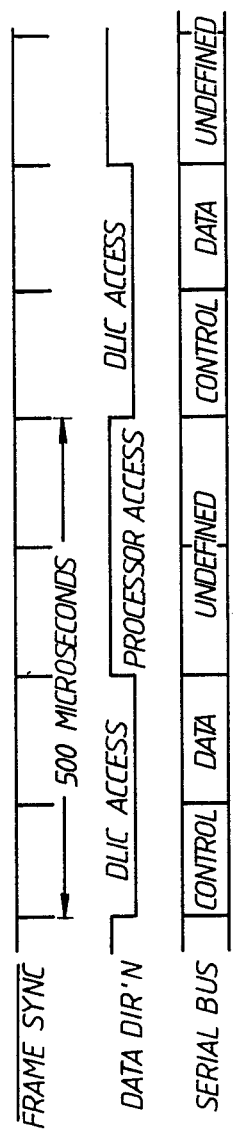

As the normal maximum data rate in these types of system is usually 16 Kbps, only every fourth timeslot is used to carry data. Consequently another timeslot can be used to send signalling immformation and the remaining two timeslots allowing the line card processor 25 to access the RAM 23 writing data to it and receiving data from it. A typical frame definition is shown in FIG. 3.

For an eight terminal application the RAM 23 has a 32 byte capacity ie a transmit control byte and data byte for each terminal.

The data from the terminal 3 stored in the RAM 23 is transmitted through the DLIC 21 in the transmit timeslot to the recipient terminal, the recipient terminal transmitting its data to the originating terminal 3 in the receive timeslot of terminal 3 (ie the tranmit timeslot of the recipient terminal). This received data passes through the DLIC 21 and along the databus highway 29 to the RAM 23 where it is stored. This received stored data is sent to the terminal 3 again through highway 29 in the two timeslots allocated to the line card processor 25 for access to the RAM 23.

In large systems, the transmit and receive highways are connected to a time switch which performs the interconnection of channels. In smaller systems, the transmit and receive wires may be connected together, with the switching function performed by the DLIC itself.

The line card processor 25 is interupted, under worst case conditions, every 500 s and thus has 250 s to perform 16 reads and 16 writes. When no data calls are set-up, no interrupts are necessary.

It will be appreciated that the specific embodiment described above could be readily modified to include doubling either the data rate or the number of data channels by re-allocating timeslots to provide 1 control, 2 data and 1 processor access every 4 time slots. Practically, the data selector, transceivers and RAM chip could be replaced by a single chip dual port RAM thus achieving a lower component count and hence a lower manufacturing cost.

An alternative embodiment of the present invention is to "packetise" the terminal data. This is achieved by providing a 8 Kbyte RAM in an eight terminal application. The RAM designates 1 Kbytes of memory to each terminal, to be divided into respective transmit and receive memory bytes.

The data is packetised in an HDLC like format, with control bytes preceding the data, and validation data following it. The efficiency increases as the ratio of data to control bytes increases. The bytes in the packet are sent and received from the highway in sequence, each separated by one frame (125 s).

I claim:

1. A time division multiplexed switching system comprising a plurality of data switching groups interconnected by a time division multiplexed data highway and coupled to central processing means, each of said switching groups comprising a plurality of data terminals connected to data interface means, the interface means comprising buffer storage means in respect of connected data terminals and control means responsive to control signals from the central processing means to transfer data to and from the data highway, each terminal in the system accessing the central processing means only when data therein is assembled for transmission, the central processing means allocating a transmit and-/or a received timeslot when so accessed and transferring control signals to allocate each time slot to the respective control means associated with the transmitting and receiving data terminals, the control means in each group causing data from the transmitting terminal to be held in the buffer storage means and to segmented that data into data segments each data segment in turn being combined with control data and transmitted to the data highway in the allocated timeslot.

2. A time division multiplexed switching system as claimd in claim 1 wherein each data segment is transferred from the buffer storage means to further memory means in which it is stored until it's respective allocated timeslot.

3. A time division multiplexed switching system as claimed in claim 2 wherein each data segment received in the data interface means is stored in the memory means, the control means storing control data from each segment in turn and reassembling the original data in the buffer store for transfer to the receiving data terminal.

4. A time division multiplexed switching system as claimed in claim 2 wherein the memory means is a random access memory (RAM).

5. A time division multiplexed switching system as claimed in claim 1 wherein the data segments are eight bit in length.

6. A time division multiplexed switching system as claimed in claim 2 wherein the memory means stores the data in eight byte segments.

7. A time division multiplexed switching system as claimed in claim 2 wherein the memory means stores the data in Kilobyte segments.

* * * * *